Aug. 22, 1944.  L. MANESS  2,356,525
PLOTTING INSTRUMENT
Filed Oct. 19, 1943  3 Sheets-Sheet 1

Inventor
Lucian Maness,
By Bair, Borden & Fox
Attorney.

Aug. 22, 1944.          L. MANESS          2,356,525
                     PLOTTING INSTRUMENT
                    Filed Oct. 19, 1943      3 Sheets-Sheet 3

Fig. 4.

Inventor
Lucian Maness,
By Bair, Borden & Fox
Attorney.

Patented Aug. 22, 1944

2,356,525

UNITED STATES PATENT OFFICE 2,356,525

PLOTTING INSTRUMENT

Lucian Maness, Chevy Chase, Md., assignor to Theo. Alteneder & Sons, Philadelphia, Pa., a corporation of Pennsylvania Application October 19, 1943, Serial No. 506,912

5 Claims. (Cl. 33—189)

This invention relates to plotting instruments, and particularly to instruments for expediting the pin-point marking of maps and the like.

While the instrument is applicable to any areas of the earth's surface and for any scale of reproduction thereof, provided the instrument is correlated with such scale, it will be explained in connection with a particular small portion of a mapped area by locating by coordinates a point thereon. By means of topographical and allied survey expeditions over a given territory, the area so surveyed has been effectively reproduced on printed maps or charts. In many cases, long after the original survey subsequent expeditions by the use of surveying and astronomical instruments have located certain points, of interest to the surveying group, in terms of latitude and longitude as actually located in the given terrain, and which points of special interest need to be translated or transposed into points on the printed maps and be accurately representative of the actual point location in the regions in which the points have first been physically located. For this purpose, the areas traversed by the surveyors and represented by large maps are reproduced in relatively small scaled map sections or portions by printing or the like, and it is necessary to mark upon these sections by pin points the points actually located by the surveyors together with symbols coordinated with or selected by the nature of the point located, whether, for purely illustrative purposes only, they comprise dams, flying fields, look-out stations, power houses, transformers, or the like. For this purpose it is customary to use as large a scale as is feasible for the integrated area under discussion, and in an illustrative form the map portions are to a scale of 1 to 62,500. This makes each unit of map for convenience comprise 15' of arc, both in latitude and longitude, and as a preliminary to the pin-pointing, the reports of the surveyors relative to each such small reproduced unit are embodied in a specification of all of the points located within that relatively small area of the given larger map.

The problem of pin-pointing the given loci would not be difficult were it not for the fact that the distance in miles represented by proportional distances on the map between latitude lines increases as one moves away from the equator, and conversely, the distance between meridians of longitude decreases as one moves away from the equator, so that it is not possible to provide a single fixed scale which would be effective for all plotted areas.

It is among the objects of this invention to provide a plotting instrument whereby a series of points defined by coordinates can be accurately located and indicated on a map, with a minimum of delay and with an obviation of errors; to simplify the method of plotting points on a map or chart; to provide a simple instrument whereby plotting is facilitated and enhanced; to provide a plotting instrument of such simplicity and ease of operation that the number of points plotted and located by an operator in a single day in contrast to all methods of the prior art, can be increased very appreciably, which, illustratively only, may be cited as an increase of as much as 700%; and other objects and advantages will become more apparent as the description proceeds.

In the accompanying drawings forming part of this description:

Fig. 4 represents a fragmentary plan of the assembled map and instrument in multiple positions used in locating a point and respectively indicated in dotted and full lines.

Figure 3:
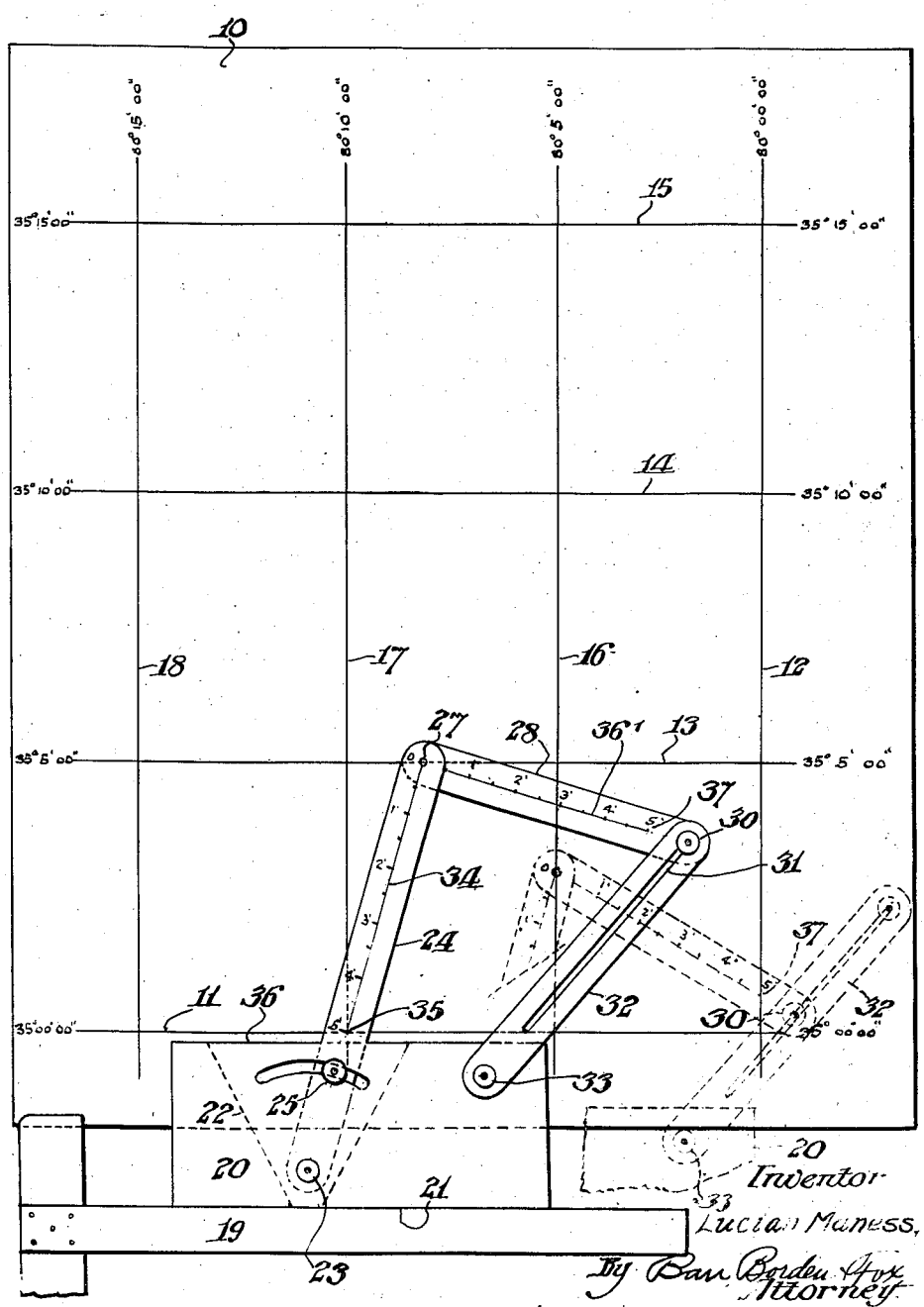
Fig. 3 represents a plan of an illustrative form of map section with the several positions of the instrument locating and using same indicated in dotted and full lines respectively.

Referring to the sectional map 10 illustrated in Fig. 3, it is important to note that the map has a base line 11 representing the abscissal axis, and a right hand margin line 12 representing the ordinate axis. The map section is divided by horizontal lines of latitude parallel to the base line 11, by the lines 13, 14 and 15, each representing five minutes of arc separation from the next adjacent latitude line shown. If the base line is at 35° 00' north latitude, which in a purely illustrative form, it is assumed to be, then line 13 represents 35° 05', line 14 represents 35° 10', and the top line 15 represents 35° 15'. Similarly, if the side margin edge 12 represents 80° 00', as it does in the illustrative form shown, and the meridians are assumed to be spaced by five minutes of arc, the substantially parallel first line 16 represents 80° 05', and lines 17 and 18 represent respectively 80° 10', and 80° 15'. The map section shown represents a geographic section with the vertically extending lines being very slightly convergent toward the top, while the horizontal lines are parallel. Obviously, it might equally well comprise a plain grid projection depicting the earth as a flat plane. In any case, the smaller substantial rectangles are representative of merely five minutes of arc in both directions, in a larger rectangle as shown, comprising the sectional unit, within which larger unit numerous points are to be located.

In setting up the instrument and map section for conjoint use, the map will be placed upon a drafting table or the like, and the lower abscissa line 11 will be made exactly parallel to the traveling straight edge 19, upon which latter the instrument of this invention is arranged to engage during all plotting. The instrument comprises the base element 20 having a lower edge 21 arranged to abut and remain in constant alignment with the traveling or movable horizontal straight edge of T-square element 19. Preferably the straight edge is susceptible to easy and facile positioning wherever desired to extend transversely of the chart or map section 10 at any horizontal position desired. The base element 20 which may be of a relatively transparent plastic, although under certain conditions, opacity is not undesirable, has a lower segmental recess 22 within which is pivoted at 23, preferably by a set screw or the like, a latitude ordinate plotting arm 24. The latter carries the thumb nut assembly 25 traveling in the arcuate slot 26 of the base, whereby the arm 24 can be locked in any desired adjusted position of angularity relative to the base 20 within the limits of the slot or recess 22.

Figure 2:
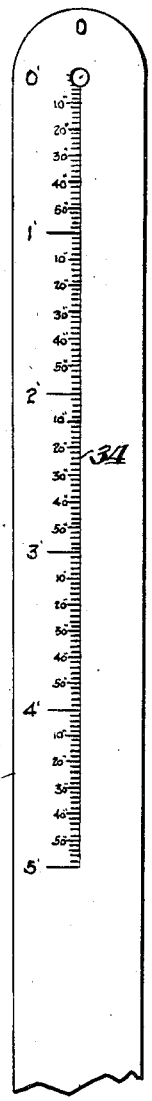
Fig. 2 represents a fragmentary enlarged plan of a portion of the instrument indicating the scale which is preferably used.

The latitude arm 24 at its outer free end has a hollow rivet or eyelet 27 through which pinpointing takes place, as will be described, and forms the pivotal axis for the laterally extending longitude abscissa arm 28. The free end of the latter is coupled through a thumb nut or set screw assembly 30, with the elongated slot 31 of the supporting arm 32, and the latter in turn is pivoted, at 33, to the base 20. It is preferred that the latitude arm 24 and the longitude arm 28 be of a transparent plastic material so that lines or other informative material can be viewed through them and so that graduations superposed over lines can be seen easily in superposed relation. Latitude arm 24 has a median row of graduations along a line 34, extending from the hollow rivet 27 to a point 35, spaced above the upper edge 36 of the base 20. As shown in detail in Fig. 2, median line 34 is graduated into a number of equal graduations preferably 150 in number, starting from the center of the hollow rivet 27, and comprising five main subdivisions bearing ordinals from "1" to "5" respectively, each representing one minute of arc, and each having thirty subdivisions preferably, numbered preferably, for convenience, in groups of five representing seconds of arc, designated respectively "10," "20," "30," "40" and "50," with the main subdivisions from "1" to "5" each representing the full 60" comprising the one minute of arc. Each small subdivision, in the preferred form, represents two seconds of arc, which is about the smallest unit that can be used for safe, accurate and quick computing and plotting. The calibration of latitude arm 24, it will be understood, may be in other units, such for instance, that each small graduation represents five seconds of arc, in which case the total number of graduations of the five minutes of arc will be 60 graduations. Similarly the longitude arm 28 has a median line 36' extending from the rivet or eyelet 27 toward the thumb nut assembly 30, and, as indicated in detail in Fig. 2, is graduated in five main divisions bearing ordinals from "1" to "5" inclusive and representing seconds of arc, with each subdivided by two second intervals and also marked in groups of five as "10," "20," "30," etc., between main subdivisions. Different markings may of course be resorted to for the longitude scale, as will be clear.

Figure 1:
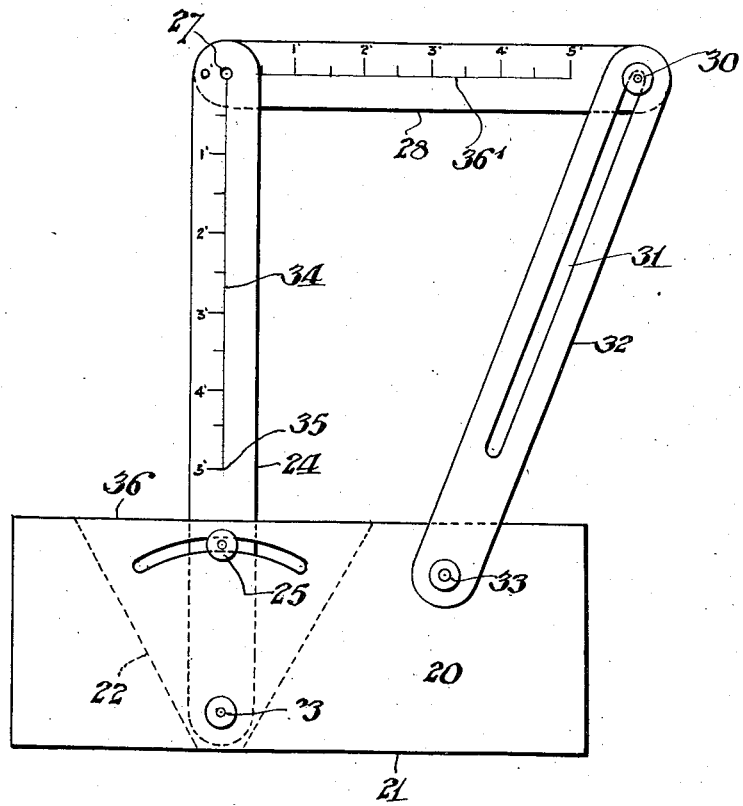
Fig. 1 represents a plan of the instrument according to a preferred form thereof, showing in dotted lines adjustments to accord with actual latitude and longitude settings less than the maximum permitted by the full line perpendicular relation shown.

It is to be observed that the markings on each scale element 24 and 28 are from the center of the common rivet toward the opposite ends of each scale. It will also be evident that the vertical distance from the zero mark adjacent to the rivet or eyelet 27 aligned with the center thereof to the line of the upper edge 36 of the base 20 is greater in the perpendicular position shown in Fig. 1, than in any other different angular position, arising from movement of arm 24 on its pivot 23 relative to the base 20. Similarly, in the perpendicular relation of arm 28 to line 34 as shown, the horizontal distance between graduation number "5" at 37, of arm 28, and the center line 34 of arm 24 terminating in rivet 27, is greater than the horizontal distance between line and point 37 of scale 36' as the longitude arm 28 swings downwardly on its common pivot in rivet 27. This factor is of the essence in the utility and efficiency of operation of the device.

It has already been stated that the preliminary assumption is a correlation between the range of latitudes and longitudes of selected "points" with the particular small area of map surface being worked upon. The first step in the procedure is to ascertain the blocks in which the work is to take place. Let it be assumed that the first point, of probably a series of more or less closely related points, is given in the specification (illustratively only) as at latitude 35° 04' 15", and the longitude is assumed to be 80° 03' 42". With the map section properly laid out on the board with its lower abscissal marginal line 11 parallel to the horizontally extending straight edge 19, the straight edge is then slid downwardly while the instrument moves downwardly with it in its maintained constant relation on the horizontal lines thereof, until the point 35 at the lower end of the latitude line 34 rests on line 11. Then if, as is probable according to the correlation between the instrument and the area being "pin-pointed," the zero point identified with the rivet 27 is above the next map latitude line 13, then, after loosening all set screws, the arm 24 is swung laterally on its pivot 23 until the center of the rivet 27 is just over line 13, while the lowermost graduation at its intersection with line 34, at 35, is over line 11, and at this juncture, the set screw or thumb nut 25 is tightened, anchoring latitude arm 24 in an angular relation to base 20 in which the extreme limits of the graduated line 34, between rivet 27 and point 35 completely and exactly covers the distance between the two adjacent latitude lines on the map representing the said five minutes of arc on the map section and by horizontal projections dividing this particular latitude band into 150 equal parts, each representing 2" of arc. The locking of the arm 24 in this position gives a predetermined and fixed angular relation by which all points in this area can be successfully and quickly determined, as will be explained.

Similarly, with the center of the eyelet or rivet 27 on the second vertical median line representing five minutes of arc difference from the marginal edge line 12, about midway between the horizontal latitude lines 11 and 13, in the usual course the terminal graduation 37 of the longitudinal scale 36 will be outward beyond the marginal line 12. By loosening the set screw assembly 30, the free end of the arm 28 can be dropped relative to the supporting arm 32, by means of slot 31, to a position in which the intersection 37 of the last graduation "5" with the line 36 will be over line 12, and with the rivet over line 16, the set screw assembly 30 is tightened, and the predetermined angular location of the arm 28 relative to the median lines to divide each five minutes of arc into 150 equal parts which can be projected vertically to secure an even division of the longitude band is fixed for the area under consideration.

The settings of the arms thus found is maintained and held during all of the point finding and locating in the small area under discussion.

With the arms fixed in their mutual angular relations the finding of the first point proceeds as follows: The ruler or parallel straight edge 19 is slid downwardly, and, bearing in mind that the latitude coordinate is 35° 04′ 30″, the ruler is slid down until, with the base line 21 of the base 20 resting on and parallel to the straight edge 19, the reading of 04′ 30″ on latitude arm 24 reading from the center of the rivet 27 on the base or latitude line 11 typifying latitude 35° 00′. The point marked by the arrow denotes the graduation superposed over line 11 to bring the center of the eyelet in a position in a horizontal line delineating 35° 04′ 30″ by its distance from the line (11) representing 35° 00′ 00″. The straight edge 19 is then held stationary while the entire plotting instrument is moved bodily sideways, maintaining the fixed relation of its base line 21 on straight edge 19, until the reading on the longitude arm 28 on longitude meridian at 80° 00′ represented by map line 12, by intersection of line 12 with the appropriate graduation on the scale of line 36 indicated by the arrow, to establish the location of the eyelet or rivet 27 on the horizontal line first established by the latitude finding, at a distance representing 03′ 42″ from margin edge 12 delineating a longitude reading of 80° 03′ 42″. The bodily movement of the then rigid unitary instrument assembly locates the center of the eyelet or rivet 27 in both the required latitude and the required longitude, pursuant to the attainment of which, a pointed implement or the like, such as a marking device, is guided perpendicularly downwardly in the rivet 27 on or into the paper or other map-bearing fabric, which is thus marked or pierced at the now properly orientated and located point.

Additional points are similarly located by first locating the vertical position of the eyelet by proper positioning of straight edge 19 and reading the desired distance from the nearest 5′ line to the scale 24, then sliding laterally to establish the proper distance from the nearest 5′ line of longitude, then marking or piercing the intersecting lines at the rivet 27. The facility and ease of operation thus provided will be appreciated.

Having thus described my invention, I claim:

1. A plotting scale comprising a base, an arm pivotally mounted on the base for adjusting movement between a perpendicular and an angular relation, a second arm pivotally mounted on the first arm at a free end thereof, a hollow rivet forming the pivotal axis of the two arms, means supporting the free end of the second arm relative to the base, means clamping the arms against pivotal movement from a position of adjustment, and the first and second arm each having a scale comprising graduations dividing the arm into five minutes of arc from the mutual pivot.

2. A plotting instrument coordinated with a map to be pinpointed comprising two relatively pivoted arms having a common pivot having an opening, a graduated scale being formed on each arm in line with the common pivot respectively, and each beginning at zero and progressing to the same predetermined number of main subdivisions a function of the scale of the map with which the instrument is coordinated, a base element to which one of said arms is pivotally connected, and means for anchoring the arms in an adjusted position relative to each other and to said base for locating pin-points on such coordinated map by latitude and longitude relative to lines thereon having the same said predetermined spacings of arc.

3. A plotting instrument comprising two relatively pivoted arms having a common pivot having an opening, a graduated scale being formed on each arm in line with the common pivot respectively, and each beginning at zero and progressing to five main subdivisions from the opening of the common pivot, a base element to which one of the said arms is pivotally connected, and means for anchoring the arms in an adjusted position relative to each other and to said base for locating pin-points by latitude and longitude relative to lines having spacings of five minutes of arc.

4. A plotting instrument comprising a base, an arm pivotally mounted on the base and adjustable projecting generally vertically from same, graduations from a point adjacent to the free end of the arm increasing toward the base delineating subdivisions of arc in minutes and seconds, means for locking the arm in an adjusted position of angularity relative to the base in which the total subdivisions of the arm are capable of extending exactly between two adjacent markings of five minute intervals of arc on a map, a longitude arm pivotally associated with the free end of the first arm, said longitude arm having graduations from the point of pivotal mounting toward the opposite end of the arm delineating subdivisions of arc in minutes and seconds, means for locking the second arm in an adjusted position of angularity relative to the first arm in which the total subdivisions between the pivot and the end of the graduations are capable of extending exactly between two adjacent markings of five minute intervals of arc on a map, whereby a point can be indicated by latitude and longitude by locating the pivotal axis of the two arms on said map.

5. In combination, a base, a first arm pivoted to the base, a second arm pivoted to the free end of the first arm, a support arm having a slot and pivoted to the base and connections for supporting the free end of the second arm adjustably on said supporting arm in said slot, and means for locking the arms and support in predetermined fixed positions.

LUCIAN MANESS.